United States Patent
Wang et al.

(10) Patent No.: US 12,283,882 B2
(45) Date of Patent: Apr. 22, 2025

(54) SUPPLY VOLTAGE GENERATING METHOD FOR A DRIVER CIRCUIT IN A POWER SYSTEM

(71) Applicant: Chengdu Monolithic Power Systems Co., Ltd., Chengdu (CN)

(72) Inventors: Rui Wang, Chengdu (CN); Haishi Wang, Chengdu (CN); Shanglin Xu, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 454 days.

(21) Appl. No.: 17/562,683

(22) Filed: Dec. 27, 2021

(65) Prior Publication Data
US 2022/0224227 A1 Jul. 14, 2022

(30) Foreign Application Priority Data
Jan. 11, 2021 (CN) .......................... 202110032729.7

(51) Int. Cl.
*H02M 3/07* (2006.01)
*H02M 1/08* (2006.01)

(52) U.S. Cl.
CPC ............... *H02M 3/07* (2013.01); *H02M 1/08* (2013.01)

(58) Field of Classification Search
CPC ........... H02M 3/07; H02M 1/08; H02M 3/158
See application file for complete search history.

(56) References Cited

U.S. PATENT DOCUMENTS

| | | | |
|---|---|---|---|
| 8,643,351 B2 | 2/2014 | Lai | |
| 8,693,276 B2* | 4/2014 | Lai | H02J 7/345 365/228 |
| 8,901,912 B2* | 12/2014 | Lee | G05F 1/468 323/288 |
| 8,970,185 B1* | 3/2015 | Sutardja | H02M 1/08 323/266 |
| 9,577,520 B2* | 2/2017 | Xiu | H02M 3/156 |
| 11,133,797 B1* | 9/2021 | Wu | H01L 29/7818 |
| 2011/0133711 A1* | 6/2011 | Murakami | H02M 1/32 323/282 |
| 2019/0013725 A1* | 1/2019 | Shinozaki | H02M 3/1588 |

FOREIGN PATENT DOCUMENTS

CN 109004820 A * 12/2018 ............. H02J 7/007

OTHER PUBLICATIONS

CN-109004820-A Translation.*

* cited by examiner

*Primary Examiner* — Thienvu V Tran
*Assistant Examiner* — Yahveh Comas Torres
(74) *Attorney, Agent, or Firm* — Perkins Coie LLP

(57) ABSTRACT

A supply voltage generating circuit and method for a power system. The power system has a power input terminal to receive an input voltage, a system output terminal to provide a system voltage, a switching circuit, a bootstrap capacitor, and a first driver circuit with a power terminal. The switching circuit works in a buck mode to convert the input voltage to the system voltage, or in a boost mode to convert the system voltage to a boost output voltage. The bootstrap capacitor provides a bootstrap voltage at a bootstrap terminal. The method is generating an input pump voltage based on the input voltage and the boost output voltage, generating a first supply voltage based on the bootstrap voltage and the input pump voltage, and providing the first supply voltage to the power terminal of the first driver circuit.

17 Claims, 6 Drawing Sheets

SUPPLY VOLTAGE GENERATING METHOD FOR A DRIVER CIRCUIT IN A POWER SYSTEM

CROSS-REFERENCE TO RELATED APPLICATIONS

This application claims the benefit of Chinese Patent Application No. 202110032729.7, filed on Jan. 11, 2021, which is incorporated herein by reference in its entirety.

TECHNICAL FIELD

This disclosure generally relates to a power system, and more particularly but not exclusively relates to a driver circuit of a power system.

BACKGROUND

Today, a power system usually has at least one power switch and at least one driver circuit to drive the at least one power switch. Usually a charge pump circuit is designed to provide a supply voltage for the at least one driver, but the driving ability of the supply voltage provided by the charge pump circuit depends on the switching frequency of the charge pump circuit or the capacitance of the flying capacitor in the charge pump circuit. If the switching frequency is low or the capacitance of the flying capacitor is small, the driving ability of the supply voltage provided by the charge pump circuit is weak, thus the power switch can not be turned on or turned off quickly. The method of increasing the switching frequency of the charge pump to improve the driving ability will increase the quiescent current of the power system, while the method of increasing the capacitance of the flying capacitance will increase the die size of the power system.

Therefore, it is desired to design a power system with a relative low quiescent current in a small die size.

SUMMARY

In accomplishing the above and other objects, the specification provides a power system. The power system has a power input terminal to receive an input voltage, and a system output terminal to provide a system voltage. The power system has an input transistor, a switching circuit coupled between the boost output terminal and the system output terminal, a bootstrap capacitor coupled between the switching node and a bootstrap terminal, a first power generation circuit, and a first driver circuit. Wherein the input transistor has a first terminal coupled to the power input terminal, a second terminal coupled to a boost output terminal, and a control terminal. The switching circuit comprises a high side transistor coupled in series with a low side transistor, the high side transistor has a source, and the low side transistor has a drain, wherein the source of the high side transistor and the drain of the low side transistor forms a switching node, and wherein the switching circuit is configured to work in a buck mode to convert the input voltage to the system voltage, or to work in a boost mode to convert the system voltage to a boost output voltage at the boost output terminal. The bootstrap capacitor is configured to provide a bootstrap voltage at the bootstrap terminal. The first power generation circuit has a first input terminal to receive the input voltage, a second input terminal to receive the boost output voltage, a third input terminal to receive the bootstrap voltage, and an output terminal to provide a first supply voltage based on the input voltage, the boost output voltage and the bootstrap voltage. The first driver circuit has a power terminal to receive the first supply voltage, a signal input terminal to receive a first control signal, and a signal output terminal to provide a first driving signal to the control terminal of the input transistor, wherein the first driving signal is generated based on the first control signal.

The specification provides a supply voltage generating method for a power system. The power system comprises a power input terminal to receive an input voltage, a system output terminal to provide a system voltage, an input transistor coupled between the power input terminal and a boost output terminal, a switching circuit coupled between the boost output terminal and the system output terminal, a bootstrap capacitor and a first driver circuit having a power terminal. The switching circuit has a high side transistor coupled in series with a low side transistor, wherein the source of the high side transistor and the drain of the low side transistor forms a switching node, and the switching circuit is configured to work in a buck mode to convert the input voltage to the system voltage, or to work in a boost mode to convert the system voltage to a boost output voltage at the boost output terminal. The bootstrap capacitor is coupled between the switching node and a bootstrap terminal, and is configured to provide a bootstrap voltage at the bootstrap terminal. The supply voltage generating method is generating an input pump voltage based on the input voltage and the boost output voltage, generating a first supply voltage based on the bootstrap voltage and the input pump voltage, and providing the first supply voltage to the power terminal of the first driver circuit.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
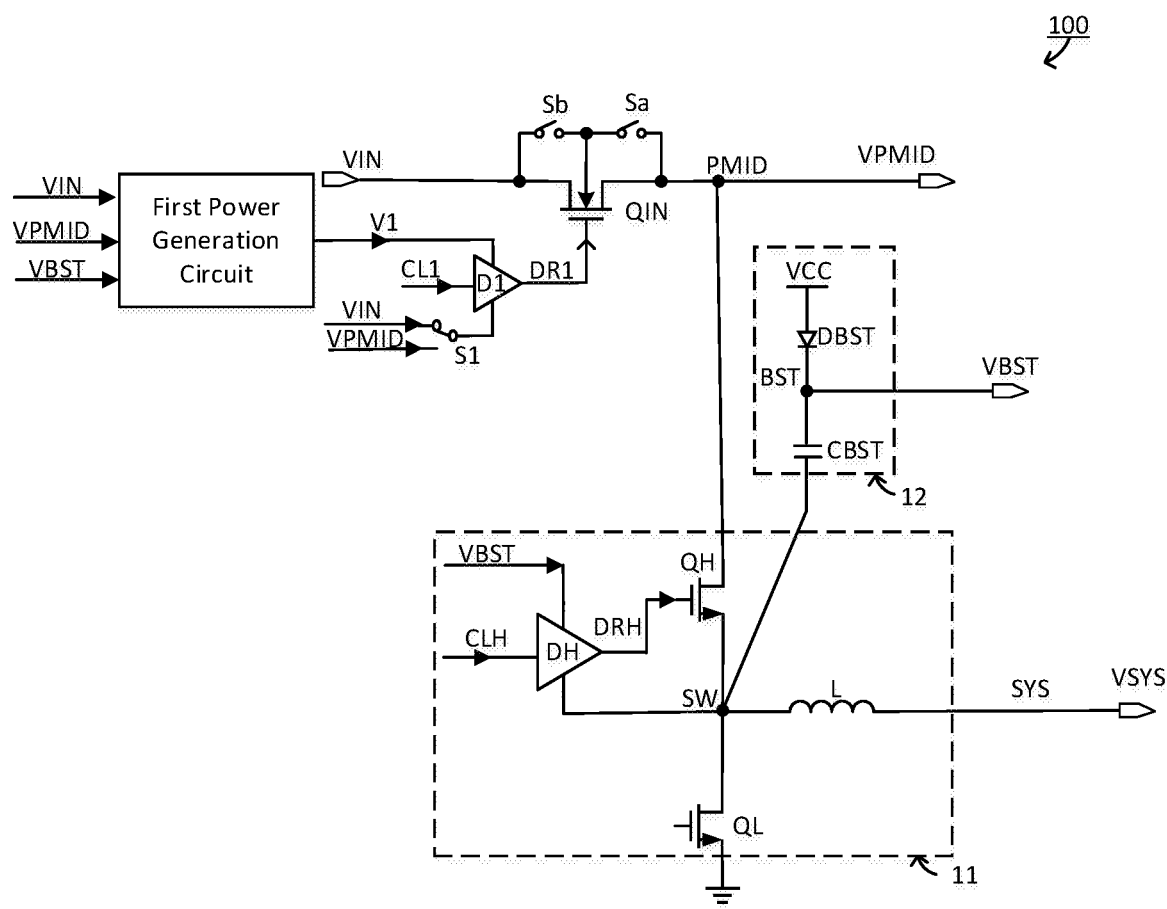
FIG. 1 illustrates a schematic diagram of a power system 100 in accordance with an embodiment of the present invention.

FIG. 1 illustrates a schematic diagram of a power system 100 in accordance with an embodiment of the present invention. The power system 100 has a power input terminal to receive an input voltage VIN, and a system output terminal SYS to provide a system voltage VSYS. The power system 100 comprises an input transistor QIN, a switching circuit 11 coupled between a boost output terminal PMID and the system output terminal SYS, a bootstrap circuit 12, a first power generation circuit and a first driver circuit D1. In FIG. 1, the input transistor QIN has a first terminal coupled to the power input terminal of the power system 100, a second terminal coupled to the boost output terminal PMID, and a control terminal coupled to the first driver circuit D1 to receive a first driving signal DR1. The switching circuit 11 is configured to work in a buck mode to convert the input voltage to the system voltage VSYS, or work in a boost mode to convert the system voltage VSYS to a boost output voltage VPMID at the boost output terminal PMID. In an embodiment, the input transistor QIN further comprises a substrate terminal, when the input voltage VIN is higher than the boost output voltage VPMID, the substrate terminal of the input transistor QIN is connected to the second terminal of the input transistor QIN, and when the input voltage VIN is lower than the boost output voltage VPMID, the substrate terminal of the input transistor QIN is connected to the first terminal of the input transistor QIN. In the embodiment of FIG. 1, when the input voltage VIN is higher than the boost output voltage VPMID, a first substrate switch Sa is turned on, and the substrate terminal of the input transistor QIN is connected to the second terminal of the input transistor QIN by the first substrate switch Sa. When the input voltage VIN is lower than the boost output voltage VPMID, the second substrate switch Sb is turned on, and the substrate terminal of the input transistor QIN is connected to the second terminal of the input transistor QIN by the second substrate switch Sb.

Still referring to FIG. 1, the switching circuit 11 comprises a high side transistor QH, a low side transistor QL, an inductor L and a high side driver circuit DH with a power terminal. The high side transistor QH has a source and a gate, while the low side transistor QL has a drain. The high side transistor QH is coupled in series with the low side transistor QL such that the source of the high side transistor QH is coupled to the drain of the low side transistor QL, the source of the high side transistor QH and the drain of the low side transistor QL forms a switching node SW having a switching voltage. In the embodiment of FIG. 1, the high side transistor QH and the low side transistor QL are coupled in series between the boost output terminal PMID and a reference ground. The inductor L is coupled between the switching node SW and the system output terminal SYS. In an embodiment, the high side transistor QH comprises an N-type MOSFET. The bootstrap circuit 12 comprises a bootstrap diode DBST coupled between a power supply node and a bootstrap terminal BST, and a bootstrap capacitor CBST coupled between the bootstrap terminal BST and the switching node SW, wherein the power supply node has a power voltage VCC which may be provided by the other circuit modules of the power system 100. The bootstrap capacitor CBST is charged by the power voltage VCC through the bootstrap diode DBST and is configured to provide a bootstrap voltage VBST at the bootstrap terminal BST. The bootstrap voltage VBST is provided to the power terminal of the high side driver circuit DH. The high side driver circuit DH further has a low potential terminal coupled to the switching node SW. The high side driver circuit DH is configured to convert a high side control signal CLH to a high side driving signal DRH, wherein the high side driving signal DRH has a low state equaling to the switching voltage, and a high state equaling to the bootstrap voltage VBST, thus the voltage difference between the gate and the source of the high side transistor QH is large enough, and the high side transistor QH can be fully turned on. In the embodiment of FIG. 1, the voltage difference between the gate and the source of the high side transistor QH substantial equals the power voltage VCC.

Continuing with FIG. 1, the first power generation circuit has a first input terminal to receive the input voltage VIN, a second input terminal to receive the boost output voltage VPMID, a third input terminal to receive the bootstrap voltage VBST, and an output terminal to provide a first supply voltage V1 based on the input voltage VIN, the boost output voltage VPMID and the bootstrap voltage VBST. The first driver circuit D1 has a power terminal coupled to the first power generation circuit to receive the first supply voltage V1, a signal input terminal to receive a first control signal CL1, and a signal output terminal to provide a first driving signal DR1 to the control terminal of the input transistor QIN, wherein the first driving signal DR1 is generated based on the first control signal CL1 and is configured to control the input transistor QIN. The first driver circuit D1 further has a low potential terminal, when the input voltage VIN is higher than the boost output voltage VPMID, the input voltage VIN is provided to the low potential terminal of the first driver circuit D1, when the input voltage VIN is lower than the boost output voltage VPMID, the boost output voltage VPMID is provided to the low potential terminal of the first driver circuit D1. In the embodiment of FIG. 1, when the input voltage VIN is higher than the boost output voltage VPMID, the low potential terminal of the first driver circuit D1 is connected to the power input terminal of the power system 100 to receive the input voltage VIN by a first driving switch S1. When the input voltage VIN is lower than the boost output voltage VPMID, the lower potential terminal of the first driver circuit D1 is connected to the boost output terminal PMID to receive the boost output voltage VPMID by the first driving switch S1.

Figure 2:
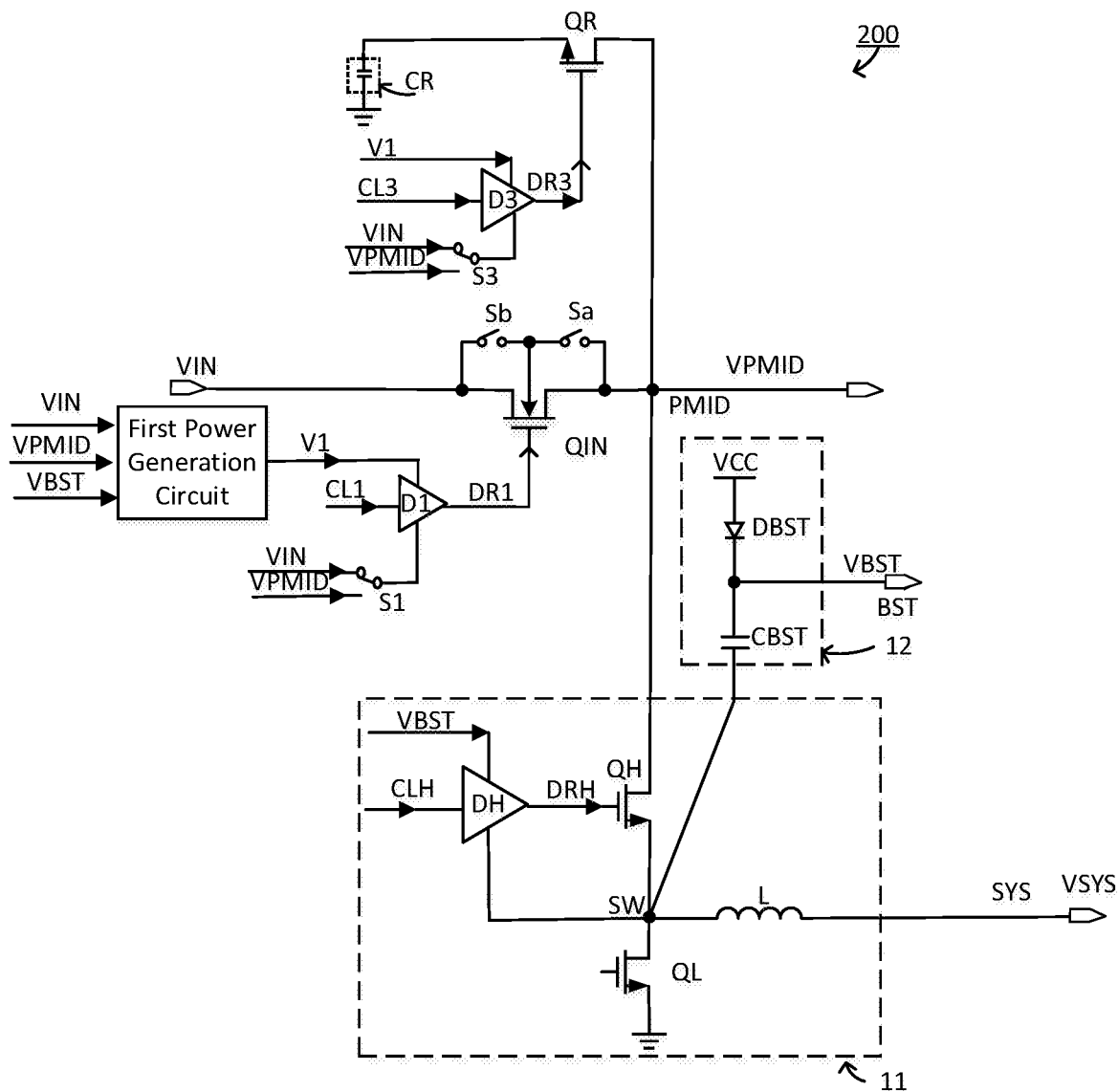
FIG. 2 illustrates a schematic diagram of a power system 200 in accordance with an embodiment of the present invention.

FIG. 2 illustrates a schematic diagram of a power system 200 in accordance with an embodiment of the present invention. Compared with the power system 100, the power system 200 further comprises a load transistor QR coupled between the boost output terminal PMID and a battery cell CR, and a load driver circuit D3, wherein the load transistor has a gate. The load driver circuit D3 has a power terminal coupled to the first power generation circuit to receive the first supply voltage V1, a signal input terminal to receive a load control signal CL3, and a signal output terminal to provide a load driving signal DR3 to the gate of the load transistor QR, wherein the load driving signal DR3 is generated based on the load control signal CL3 and is configured to turn on or turn off the load transistor QR. In an embodiment, the load driver circuit D3 further has a low potential terminal, when the input voltage VIN is higher than the boost output voltage VPMID, the low potential terminal of the load driver circuit D3 is connected to the power input terminal of the power system 200 to receive the input voltage VIN by a load driving switch S3. When the input voltage VIN is lower than the boost output voltage VPMID, the low potential terminal of the load driver circuit D3 is connected to the boost output terminal PMID of the power system 200 to receive the boost output voltage VPMID by the load driving switch S3.

Figure 3:
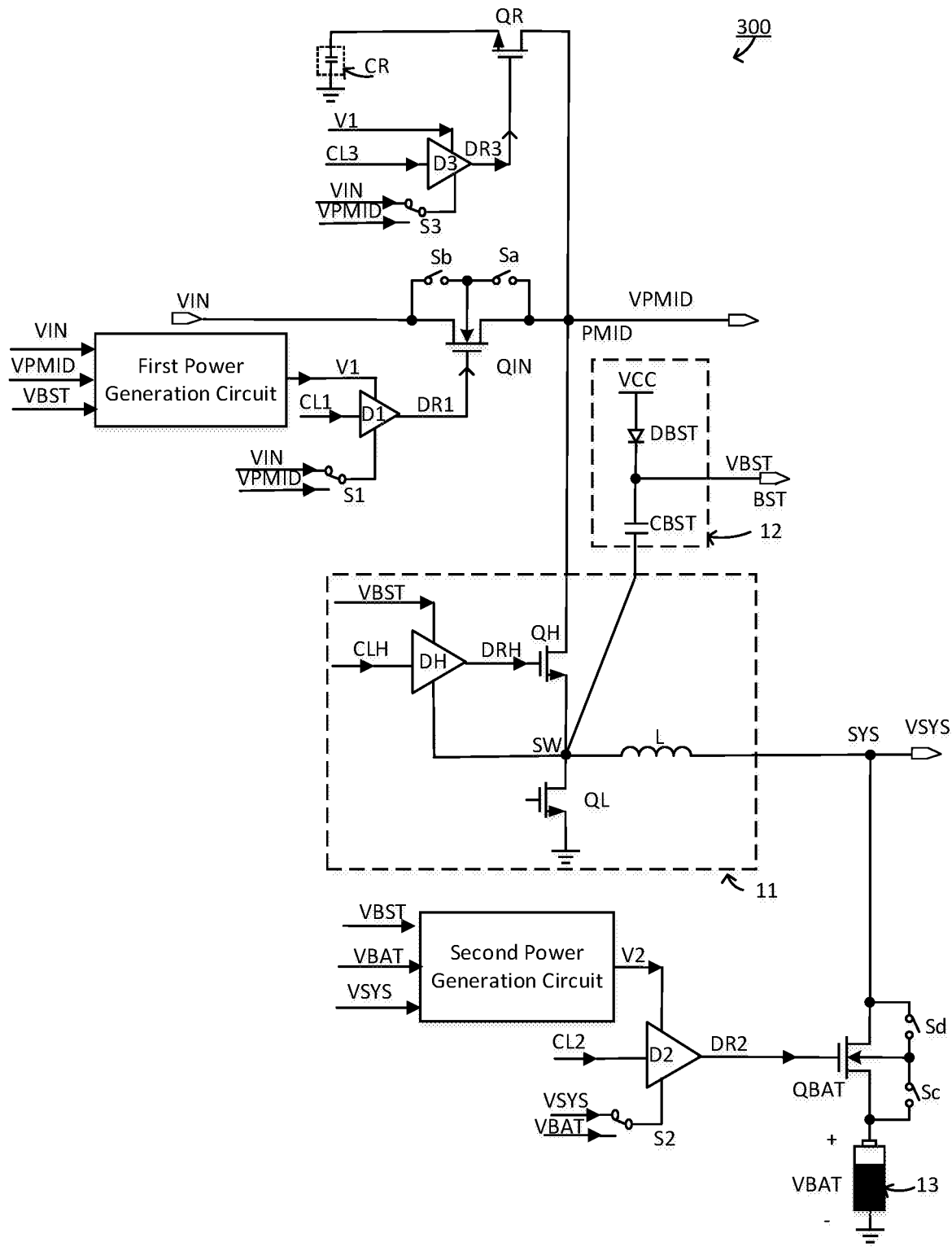
FIG. 3 illustrates a schematic diagram of a power system 300 in accordance with an embodiment of the present invention.

FIG. 3 illustrates a schematic diagram of a power system 300 in accordance with an embodiment of the present invention. Compared to the power system 200, the power system 300 further comprises a charging transistor QBAT, a second power generation circuit and a second driver circuit D2. The charging transistor QBAT has a first terminal coupled to the system output terminal SYS, a second terminal coupled to a battery pack 13, and a control terminal, wherein the battery pack 13 has a battery voltage VBAT. In an embodiment, the charging transistor QBAT further has a substrate terminal, when the system voltage VSYS is higher than the battery voltage VBAT, a third substrate switch Sc turns on, and the substrate terminal of the charging transistor QBAT is connected to the second terminal of the charging transistor QBAT by the third substrate switch Sc, when the system voltage VSYS is lower than the battery voltage VBAT, a fourth substrate switch Sd turns on, and the substrate terminal of the charging transistor QBAT is connected to the first terminal of the charging transistor QBAT by the fourth substrate switch Sd. The second power generation circuit has a first input terminal to receive the bootstrap voltage VBST, a second input terminal to receive the battery voltage VBAT, a third input terminal to receive the system voltage VSYS, and an output terminal to provide a second supply voltage V2, wherein the second supply voltage V2 is generated based on the bootstrap voltage VBST, the battery voltage VBAT and the system voltage VSYS.

Still referring to FIG. 3, the second driver circuit D2 has a power terminal coupled to the output terminal of the second power generation circuit D2 to receive the second supply voltage V2, a signal input terminal to receive a second control signal CL2 and a signal output terminal to provide a second driving signal DR2 to the control terminal of the charging transistor QBAT, wherein the second driving signal DR2 is generated based on the second control signal CL2 to turn on or turn off the charging transistor QBAT. In an embodiment, the second driver circuit D2 further has a low potential terminal, when the system voltage VSYS is higher than the battery voltage VBAT, the low potential terminal of the second driver circuit D2 is connected to the system output terminal SYS to receive the system voltage VSYS by a second driving switch S2, when the system voltage VSYS is lower than the battery voltage VBAT, the low potential terminal of the second driver circuit D2 is connected to the battery pack 13 to receive the battery voltage VBAT by the second driving switch S2.

Figure 4:
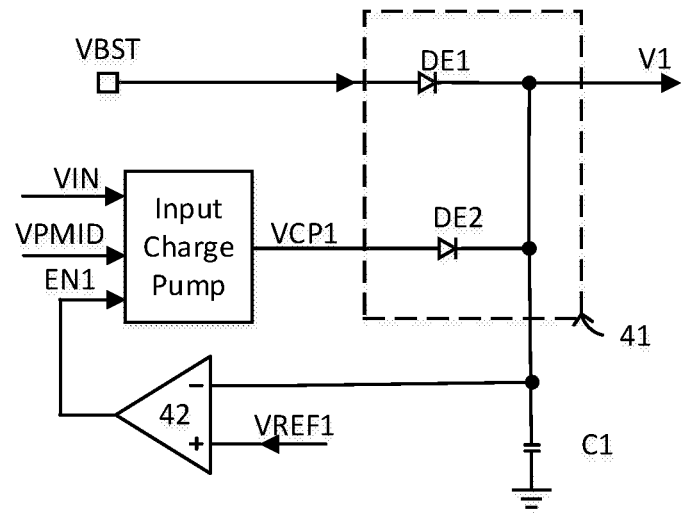
FIG. 4 illustrates a schematic diagram of the first power generation circuit in accordance with an embodiment of the present invention.

FIG. 4 illustrates a schematic diagram of the first power generation circuit in accordance with an embodiment of the present invention. The first power generation circuit comprises an input charge pump and an input selection circuit 41. The input charge pump has a first input terminal to receive the input voltage VIN, a second input terminal to receive the boost output voltage VPMID, and an output terminal to provide an input pump voltage VCP1 based on the input voltage VIN and the boost output voltage VPMID. When the input voltage VIN is higher than the boost output voltage VPMID, the input pump voltage VCP1 is generated based on the input voltage VIN, and the input pump voltage VCP1 is higher than the input voltage VIN. When the input voltage VIN is lower than the boost output voltage VPMID, the input pump voltage VCP1 is generated based on the boost output voltage VPMID, and the input pump voltage VCP1 is higher than the boost output voltage VPMID. The input selection circuit 41 has a first input terminal to receive the bootstrap voltage VBST, a second input terminal to receive the input pump voltage VCP1, and is configured to generate the first supply voltage V1 based on the bootstrap voltage VBST and the input pump voltage VCP1. Specifically, when the bootstrap voltage VBST is higher than the input pump voltage VCP1, the first supply voltage V1 is generated based on the bootstrap voltage VBST. When the bootstrap voltage VBST is lower than the input pump voltage VCP1, the first supply voltage V1 is generated based on the input pump voltage VCP1. In the embodiment of FIG. 4, the input selection circuit 41 comprises a first diode DE1 and a second diode DE2, wherein the first diode DE1 has an anode terminal to receive the bootstrap voltage VBST, and a cathode terminal coupled to the output terminal of the input selection circuit 41. The second diode DE2 has an anode terminal to receive the input pump voltage VCP1, and a cathode terminal coupled to the output terminal of the input selection circuit 41.

Still referring to FIG. 4, the first power generation circuit further comprises an input enable circuit 42. The input enable circuit 42 comprises a first input terminal to receive the first supply voltage V1, a second input terminal to receive a first threshold voltage VREF1, and an output terminal to provide a first enable signal EN1. When the first supply voltage V1 is higher than the first threshold voltage VREF1, the first enable signal EN1 is generated to disable the input charge pump. In an embodiment, the first threshold voltage VREF1 is in a range from 3V to 6V. In an embodiment, the input charge pump comprises at least one switch, and the input pump voltage VCP1 is generated by switching the at least one switch, thus the first enable signal EN1 disable the input charge pump means the at least one switch is controlled to stop switching.

Figure 5:
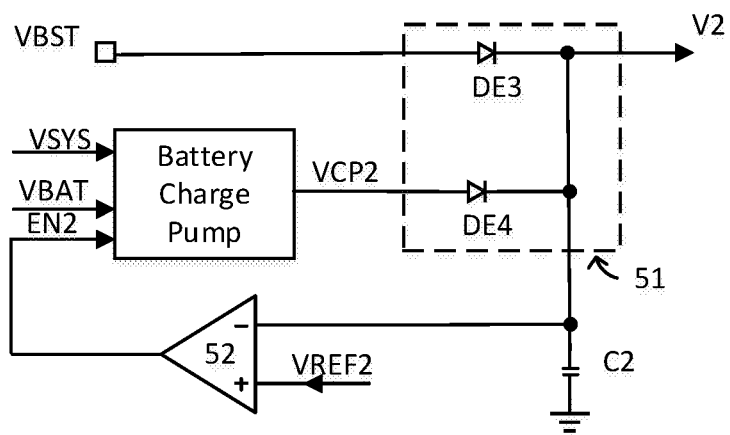
FIG. 5 illustrates a schematic diagram of the second power generation circuit in accordance with an embodiment of the present invention.

FIG. 5 illustrates a schematic diagram of the second power generation circuit in accordance with an embodiment of the present invention. The second power generation circuit comprises a battery charge pump and a battery selection circuit 51. The battery charge pump comprises a first input terminal to receive the system voltage VSYS, a second terminal to receive the battery voltage VBAT, the charge pump generates a battery pump voltage VCP2 based on the system voltage VSYS and the battery voltage VBAT. When the system voltage VSYS is higher than the battery voltage VBAT, the battery pump voltage VCP2 is generated based on the system voltage VSYS, when the system voltage VSYS is lower than the battery voltage VBAT, the battery pump voltage VCP2 is generated based on the battery voltage VBAT. The battery selection circuit 51 receives the battery pump voltage VCP2 and the bootstrap voltage VBST, and generates the second supply voltage V2 based on the battery pump voltage VCP2 and the bootstrap voltage VBST. Wherein when the bootstrap voltage VBST is higher than the battery pump voltage VCP2, the second supply voltage V2 is generated based on the bootstrap voltage VBST. When the bootstrap voltage VBST is lower than the battery pump voltage VCP2, the second supply voltage V2 is generated based on the battery pump voltage VCP2. The battery selection circuit 51 comprises a third diode DE3 and a fourth diode DE4, wherein the third diode DE3 comprises an anode terminal to receive the bootstrap voltage VBST and a cathode terminal coupled to the output terminal of the battery selection circuit 51, the fourth diode DE4 comprises an anode terminal to receive the battery pump voltage VCP2, and a cathode terminal coupled to the output terminal of the battery selection circuit 51.

Still referring to FIG. 5, the second power generation circuit further comprises a battery enable circuit 52. The battery enable circuit 52 comprises a first input terminal to receive the second supply voltage V2, a second input terminal to receive a second threshold voltage VREF2, and an output terminal to provide a second enable signal EN2. When the second supply voltage V2 is higher than the second threshold voltage VREF2, the second enable signal EN2 is generated to disable the battery charge pump. In an embodiment, the second threshold voltage VREF2 is in a range from 3V to 6V. In an embodiment, the second threshold voltage VRE2 is equal to the first threshold voltage VREF1.

Figure 6:
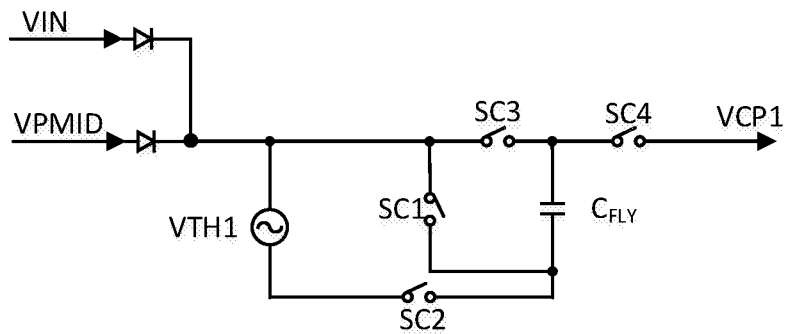
FIG. 6 illustrates a schematic diagram of the input charge pump in accordance with an embodiment of the present invention.

FIG. 6 illustrates a schematic diagram of the input charge pump in accordance with an embodiment of the present invention. The input charge pump comprises a first input terminal to receive the input voltage VIN, a second input terminal to receive the boost output voltage VPMID, and an output terminal to provide the input pump voltage VCP1. The input charge pump further comprises a bias power having a bias voltage VTH1, a flying capacitor $C_{FLY}$, a first set of switches (a first switch SC1 and a fourth switch SC4), and a second set of switches (a second switch SC2 and a third switch SC3). In an embodiment, the bias voltage VTH1 is in a range from 3V to 6V. The operation principle of the input charge pump will be illustrated with reference with FIG. 6. When the input voltage VIN is higher than the boost output voltage VPMID, the input pump voltage VCP1 is regulated to be equal to a sum of the input voltage VIN and the bias voltage VTH1 by controlling the on or off of the first set of switches and the second set of switches. When the input voltage VIN is lower than the boost output voltage VPMID, the input pump voltage VCP1 is regulated to be equal to a sum of the boost output voltage VPMID and the bias voltage VTH1. Specifically, the input pump voltage VCP1 is generated by controlling the switching of the first set of switches and the second set of switches in a series of switching cycles, wherein each switching cycle has a first period and a second period. In the first period, the first switch SC1 and the forth switch SC4 are turned off, while the second switch SC2 and the third switch SC3 are turned on. In the second period, the first switch SC1 and the fourth switch SC4 are turned on, while the second switch SC2 and the third switch SC3 are turned off, the flying capacitor $C_{FLY}$ are configured to provide the input pump voltage VCP1 at the output terminal of the input charge pump through the fourth switch SC4.

It should be understood that, the circuit diagram of the input charge pump shown in FIG. 6 is just take for example, one with ordinary skill in this art should know that any circuit that can generate the input pump voltage VCP1 based on the input voltage VIN and the bootstrap voltage VBST are suitable for this invention.

Figure 7:
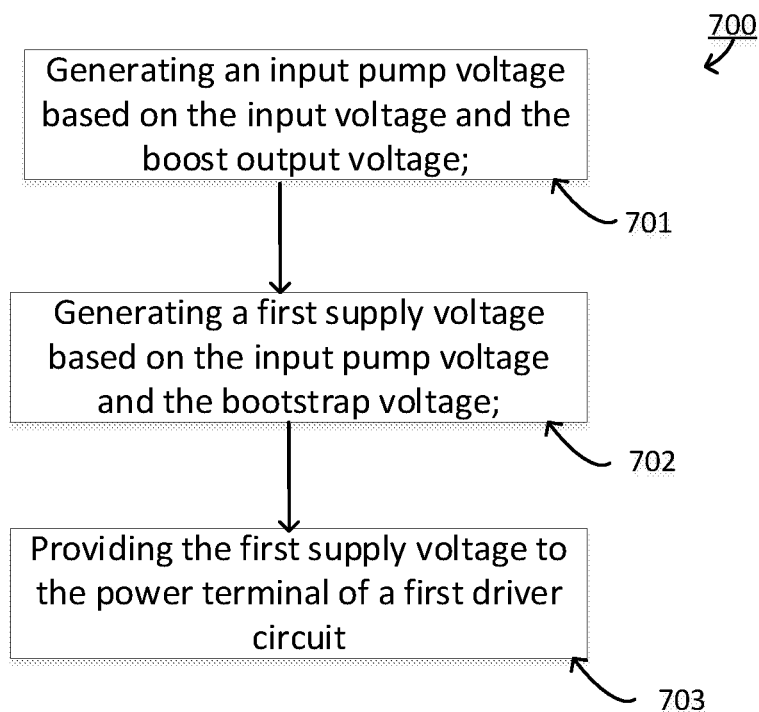
FIG. 7 illustrates a method 700 of providing the first supply voltage V1 for the first driver circuit D1 in the power system 100 of FIG. 1 in accordance with an embodiment of the present invention.

FIG. 7 illustrates a method 700 of providing the first supply voltage V1 for the first driver circuit D1 in the power system 100 of FIG. 1 in accordance with an embodiment of the present invention. The method 700 will be illustrated with reference to the power system 100 of FIG. 1 for better understanding. The method 700 comprises steps 701-703. In step 701, generating the input pump voltage VCP1 based on the input voltage VIN and the boost output voltage VPMID. Specifically, when the input voltage VIN is higher than the boost output voltage VPMID, the input pump voltage VCP1 is generated based on the input voltage VIN, when the input voltage VIN is lower than the boost output voltage VPMID, the input pump voltage VCP1 is generated based on the boost output voltage VPMID. In step 702, generating the first supply voltage V1 based on the input pump voltage VCP1 and the bootstrap voltage VBST. Specifically, when the bootstrap voltage VBST is higher than the input pump circuit VCP1, the first supply voltage V1 is generated based on the bootstrap voltage VBST, when the bootstrap voltage VBST is lower than the input pump voltage VCP1, the first supply voltage V1 is generated based on the input pump voltage VCP1. In step 703, providing the first supply voltage V1 to the power terminal of the first driver circuit D1.

Figure 8:
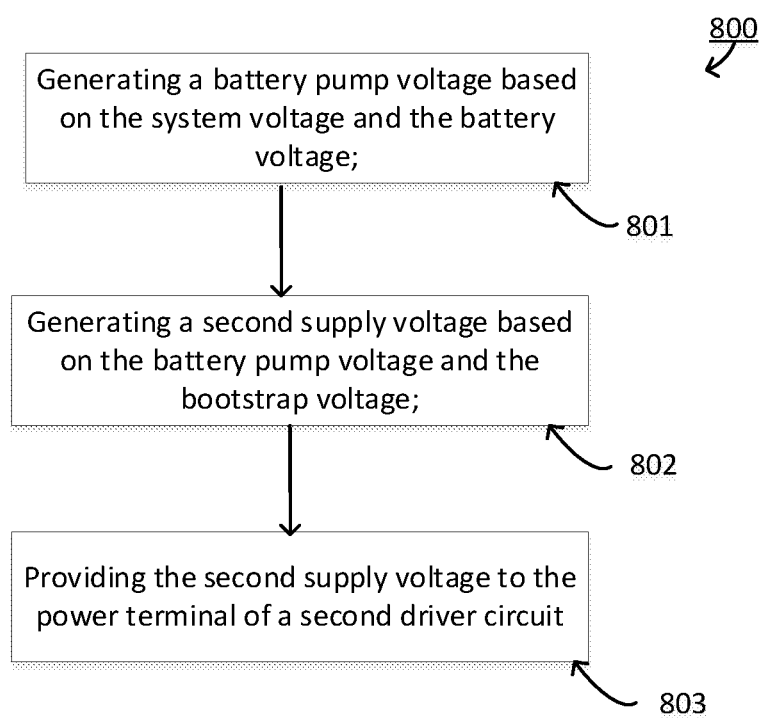
FIG. 8 illustrates a method 800 of providing the second supply voltage V2 for the second driver circuit D2 in the power system 300 of FIG. 3 in accordance with an embodiment of the present invention.

FIG. 8 illustrates a method 800 of providing the second supply voltage V2 for the second driver circuit D2 in the power system 300 of FIG. 3 in accordance with an embodiment of the present invention. The method 800 will be illustrated with reference to the power system 300 of FIG. 3 for better understanding. The method 800 comprises steps 801-803. In step 801, generating the battery pump voltage VCP2 based on the system voltage VSYS and the battery voltage VBAT. Specifically, when the system voltage VSYS is higher than the battery voltage VBAT, the battery pump voltage VCP2 is generated based on the system voltage VSYS, when the system voltage VSYS is lower than the battery voltage VBAT, the battery pump voltage VCP2 is generated based on the battery voltage VBAT. In step 802, generating the second supply voltage V2 based on the charge pump voltage VCP2 and the bootstrap voltage VBST. Specifically, when the bootstrap voltage VBST is higher than the battery pump voltage VCP2, the second supply voltage V2 is generated based on the bootstrap voltage VBST, when the bootstrap voltage VBST is lower than the battery pump voltage VCP2, the second supply voltage V2 is generated based on the battery pump voltage VCP2. In step 803, providing the second supply voltage V2 to the power terminal of the second driver circuit D2.

For the power system in accordance with various embodiments of the present invention, not only the input charge pump is designed and configured to generate the first supply voltage V1, but the bootstrap circuit 12 is designed and configured to generate the first supply voltage V1, thus the driving ability of the first supply voltage V1 provided to the first driver circuit D1 is increased with no increase on the die size or on the quiescent current of the power system.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A power system, the power system comprising:
a power input terminal, configured to receive an input voltage;
a system output terminal, configured to provide a system voltage;
an input transistor, having a first terminal coupled to the power input terminal, a second terminal coupled to a boost output terminal, and a control terminal;
a switching circuit, coupled between the boost output terminal and the system output terminal, wherein the switching circuit having a high side transistor coupled in series with a low side transistor, the high side transistor has a source, and the low side transistor has a drain, wherein the source of the high side transistor and the drain of the low side transistor forms a switching node, and wherein the switching circuit is configured to work in a buck mode to convert the input voltage to the system voltage, or to work in a boost mode to convert the system voltage to a boost output voltage at the boost output terminal;
a bootstrap capacitor, coupled between the switching node and a bootstrap terminal, wherein the bootstrap capacitor is configured to provide a bootstrap voltage at the bootstrap terminal;
a first power generation circuit, having a first input terminal to receive the input voltage, a second input terminal to receive the boost output voltage, a third input terminal to receive the bootstrap voltage, and an output terminal to provide a first supply voltage based on the input voltage, the boost output voltage and the bootstrap voltage; and
a first driver circuit, having a power terminal to receive the first supply voltage, a signal input terminal to receive a first control signal, and a signal output terminal to provide a first driving signal to the control terminal of the input transistor, wherein the first driving signal is generated based on the first control signal.

2. The power system of claim 1, further comprising:
a load transistor, coupled between the boost output terminal and a battery cell, wherein the load transistor has a gate; and
a load driver circuit, having a power terminal to receive the first supply voltage, a signal input terminal to receive a load control signal, and a signal output terminal to provide a load driving signal to the gate of the load transistor, wherein the load driving signal is generated based on the load control signal.

3. The power system of claim 2, wherein the load driver circuit further has a low potential terminal, and wherein when the input voltage is higher than the boost output voltage, the input voltage is provided to the low potential terminal of the load driver circuit, when the input voltage is lower than the boost output voltage, the boost output voltage is provided to the low potential terminal of the load driver circuit.

4. The power system of claim 1, wherein the first driver circuit further has a low potential terminal, and wherein when the input voltage is higher than the boost output voltage, the input voltage is provided to the low potential terminal of the first driver circuit, when the input voltage is lower than the boost output voltage, the boost output voltage is provided to the low potential terminal of the first driver circuit.

5. The power system of claim 1, wherein the first power generation circuit comprises:
an input charge pump, having a first input terminal to receive the input voltage, a second input terminal to receive the boost output voltage, and an output terminal to provide an input pump voltage based on the input voltage and the boost output voltage, wherein when the input voltage is higher than the boost output voltage, the input pump voltage is generated based on the input voltage, when the input voltage is lower than the boost output voltage, the input pump voltage is generated based on the boost output voltage; and
an input selection circuit, having a first input terminal to receive the bootstrap voltage, a second input terminal to receive the input pump voltage, and an output terminal to provide the first supply voltage based on the bootstrap voltage and the input pump voltage, wherein when the bootstrap voltage is higher than the input pump voltage, the first supply voltage is generated based on the bootstrap voltage, when the bootstrap voltage is lower than the input pump voltage, the first supply voltage is generated based on the input pump voltage.

6. The power system of claim 5, wherein the input charge pump comprises at least one switch, and the input pump voltage is generated by switching the at least one switch.

7. The power system of claim 6, wherein the first power generation circuit further comprises an input enable circuit, the input enable circuit has a first input terminal to receive the first supply voltage, and a second input terminal to receive a first threshold voltage, and when the first supply voltage is higher than the first threshold voltage, the at least one switch of the input charge pump stops switching.

8. The power system of claim 1, further comprising:
a charging transistor, having a first terminal coupled to the system output terminal, a second terminal coupled to a battery pack, and a control terminal;
a second power generation circuit, having a first input terminal to receive the bootstrap voltage, a second input terminal to receive the battery voltage, and a third input terminal to receive the system voltage, and an output terminal to provide a second supply voltage based on the bootstrap voltage, the battery voltage and the system voltage; and
a second driver circuit, having a power terminal to receive the second supply voltage, a signal input terminal to receive a second control signal, and an output terminal to provide a second driving signal to the control terminal of the charging transistor, wherein the second driving signal is generated based on the second control signal.

9. The power system of claim 8, wherein the second power generation circuit comprises:

a battery charge pump, having a first input terminal to receive the system voltage, a second input terminal to receive the battery voltage, and an output terminal to provide a battery pump voltage based on the system voltage and the battery voltage, wherein when the system voltage is higher than the battery voltage, the input pump voltage is generated based on the system voltage, when the system voltage is lower than the battery voltage, the battery pump voltage is generated based on the battery voltage; and a battery selection circuit, having a first input terminal to receive the bootstrap voltage, a second input terminal to receive the battery pump voltage, and an output terminal to provide the second supply voltage based on the bootstrap voltage and the battery pump voltage, wherein when the bootstrap voltage is higher than the battery pump voltage, the second supply voltage is generated based on the bootstrap voltage, when the bootstrap voltage is lower than the battery pump voltage, the second supply voltage is generated based on the battery pump voltage.

10. The power system of claim 8, wherein the second driver circuit further has a low potential terminal, when the system voltage is higher than the battery voltage, the system voltage is provided to the low potential terminal, when the system voltage is lower than the battery voltage, the battery voltage is provided to the low potential terminal.

11. The power system of claim 1, wherein the switching circuit further has an inductor coupled between the switching node and the system output terminal.

12. The power system of claim 1, wherein the high side transistor and the low side transistor are coupled in series between the boost output terminal and a reference ground.

13. A supply voltage generating method for a power system, the power system has a power input terminal to receive an input voltage, a system output terminal to provide a system voltage, an input transistor coupled between the power input terminal and a boost output terminal, a switching circuit coupled between the boost output terminal and the system output terminal, a bootstrap capacitor, and a first driver circuit having a power terminal, the switching circuit has a high side transistor coupled in series with a low side transistor, the high side transistor has a source, and the low side transistor has a drain, wherein the source of the high side transistor and the drain of the low side transistor forms a switching node, and the switching circuit is configured to convert the input voltage to the system voltage when operating in a buck mode, and to convert the system voltage to a boost output voltage at the boost output terminal when operating in a boost mode, the bootstrap capacitor is coupled between the switching node and a bootstrap terminal, and is configured to provide a bootstrap voltage at the bootstrap terminal, the supply voltage generating method comprising:

generating an input pump voltage based on the input voltage and the boost output voltage;

generating a first supply voltage based on the bootstrap voltage and the input pump voltage;

providing the first supply voltage to the power terminal of the first driver circuit;

and wherein the power system further comprises a second driver circuit with a power terminal, and a charging transistor coupled between the system output terminal and a battery pack, the battery pack has a battery voltage;

and wherein the supply voltage generating method further comprising:

generating a battery pump voltage based on the system voltage and the battery voltage;

generating a second supply voltage based on the bootstrap voltage and the battery pump voltage; and providing the second voltage to the power terminal of the second driver circuit.

14. The supply voltage generating method of claim 13, wherein the step of generating the input pump voltage based on the input voltage and the boost output voltage comprises: wherein when the input voltage is higher than the boost output voltage, the input pump voltage is generated based on the input voltage, and when the input voltage is lower than the boost output voltage, the input pump voltage is generated based on the boost output voltage.

15. The supply voltage generating method of claim 13, wherein the step of generating the first supply voltage based on the bootstrap voltage and the input pump voltage comprises: wherein when the bootstrap voltage is higher than the input pump voltage, the first supply voltage is generated based on the bootstrap voltage; and when the bootstrap voltage is lower than the input pump voltage, the first supply voltage is generated based on the input pump voltage.

16. The supply voltage generating method of claim 13, wherein the step of generating the battery pump voltage based on the system voltage and the battery voltage comprises: wherein when the system voltage is higher than the battery voltage, the battery pump voltage is generated based on the system voltage, and when the system voltage is lower than the battery voltage, the battery pump voltage is generated based on the battery voltage.

17. The supply voltage generating method of claim 13, wherein the step of generating the second supply voltage based on the bootstrap voltage and the battery pump voltage comprises: wherein when the bootstrap voltage is higher than the battery pump voltage, the second supply voltage is generated based on the bootstrap voltage, and when the bootstrap voltage is lower than the battery pump voltage, the second supply voltage is generated based on the battery pump voltage.

* * * * *